Jan. 20, 1942.　　　T. E. D. BILDE　　　2,270,695
DISHWASHING MACHINE
Filed Feb. 14, 1940　　　5 Sheets-Sheet 4
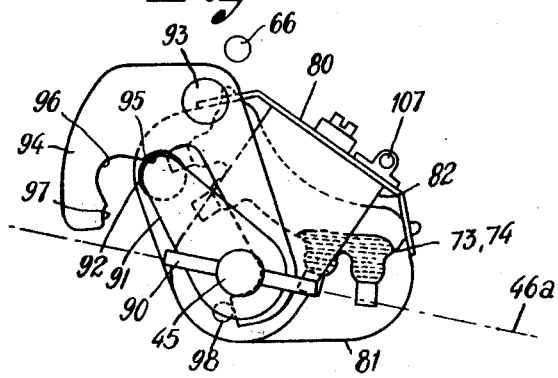
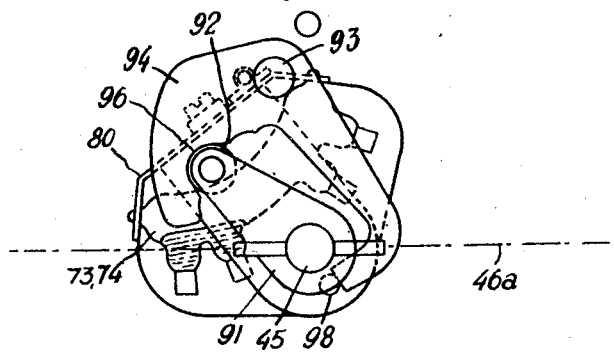
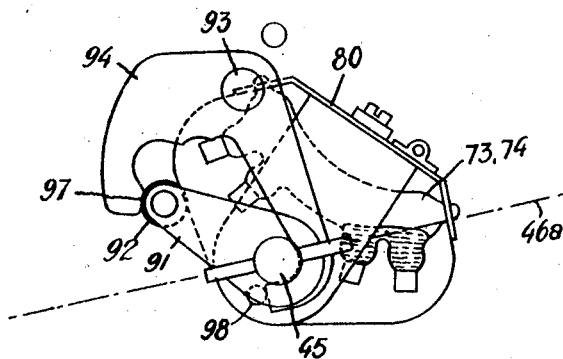
Inventor:
Tord Erik Daniel Bilde,
By Cushman Darby Cushman
Attys.

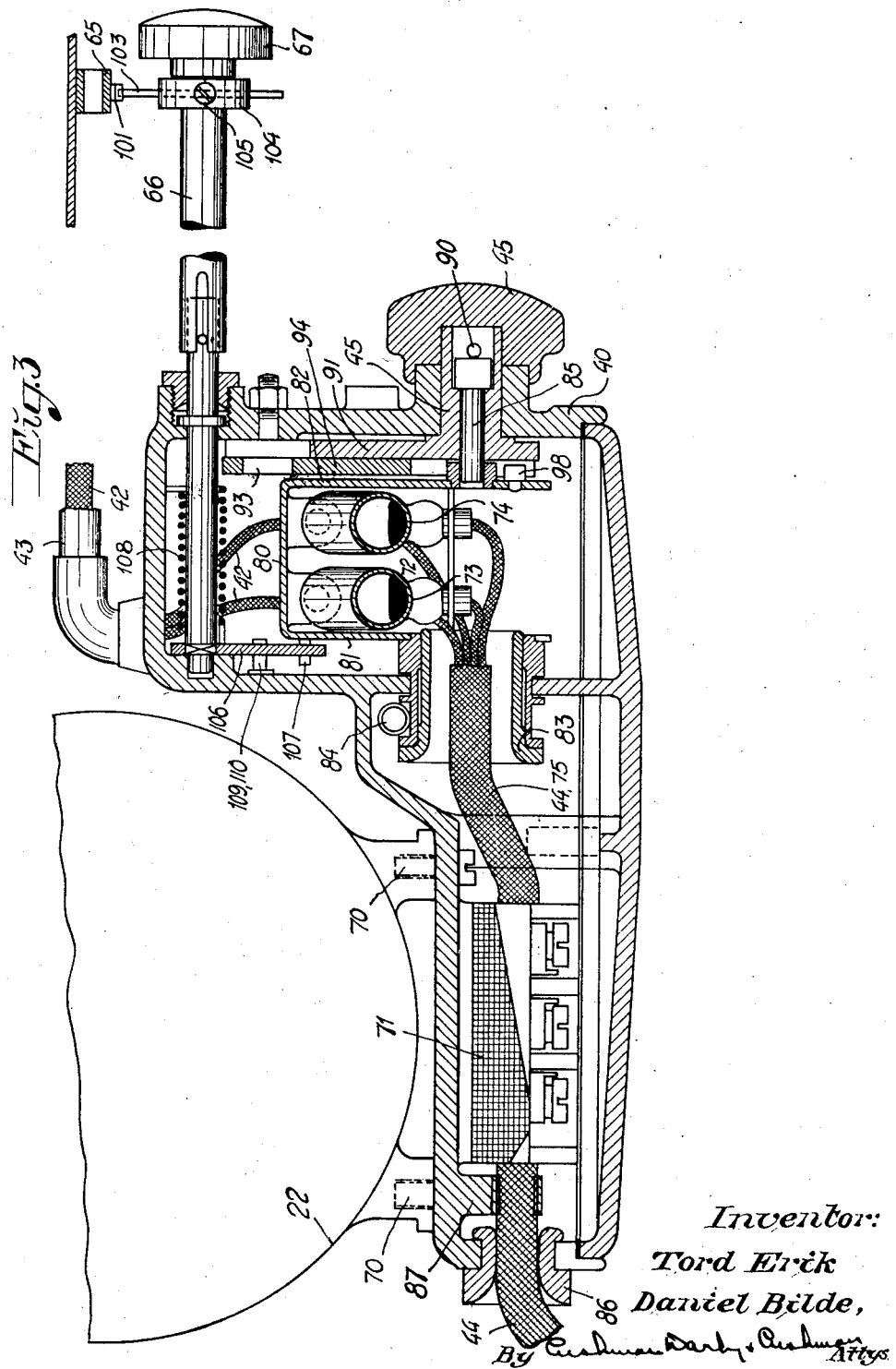

Jan. 20, 1942.                T. E. D. BILDE                2,270,695
                          DISHWASHING MACHINE
                         Filed Feb. 14, 1940          5 Sheets-Sheet 5
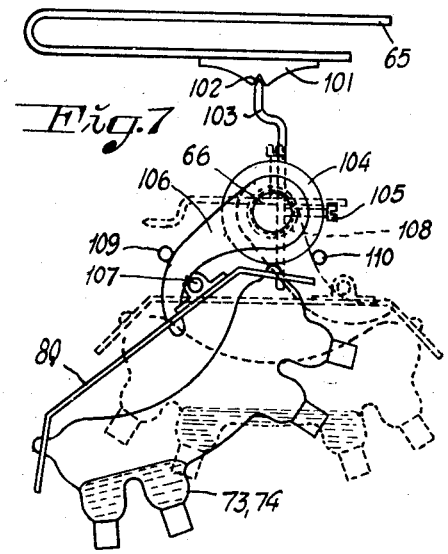
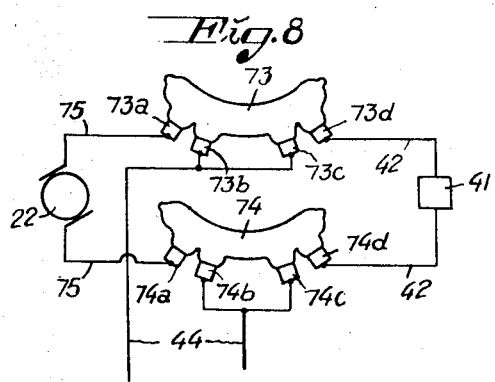
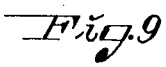
Inventor:
Tord Erik Daniel Bilde,
By Cushman Darby Cushman
Attys.

Patented Jan. 20, 1942

2,270,695

UNITED STATES PATENT OFFICE 2,270,695

DISHWASHING MACHINE

Tord Erik Daniel Bilde, Ulvsunda, Sweden, assignor to Bolinder's Fabriks Aktiebolag, Stockholm, Sweden, a corporation of Sweden Application February 14, 1940, Serial No. 318,929
In Sweden March 3, 1939

3 Claims. (Cl. 219—39)

The present invention relates to dish washing machines having a pump driven by an electric motor for forwarding a liquid intended for cleaning the dishes as well as an electric heater for heating said liquid.

The principal object of the invention is to provide a dish washing machine of the type described having a common switch for the control of the motor and the heater and common control means for said switch and a liquid flow control valve permitting an economical and safe operation of the machine.

Further objects of the invention will be apparent according as the following description proceeds, reference being had to the accompanying drawings showing by way of example an embodiment of the invention.

In the drawings:

Fig. 3 is a longitudinal sectional view of the control box on an enlarged scale.

Figs. 4, 5 and 6 show the switch in different positions of setting as seen from the right in Fig. 3.

Fig. 7 illustrates a thermostat and the connection thereof with the switch.

Fig. 8 is a wire diagram.

Fig. 9 is a rear view of the instrument panel on an enlarged scale.

Figure 1:
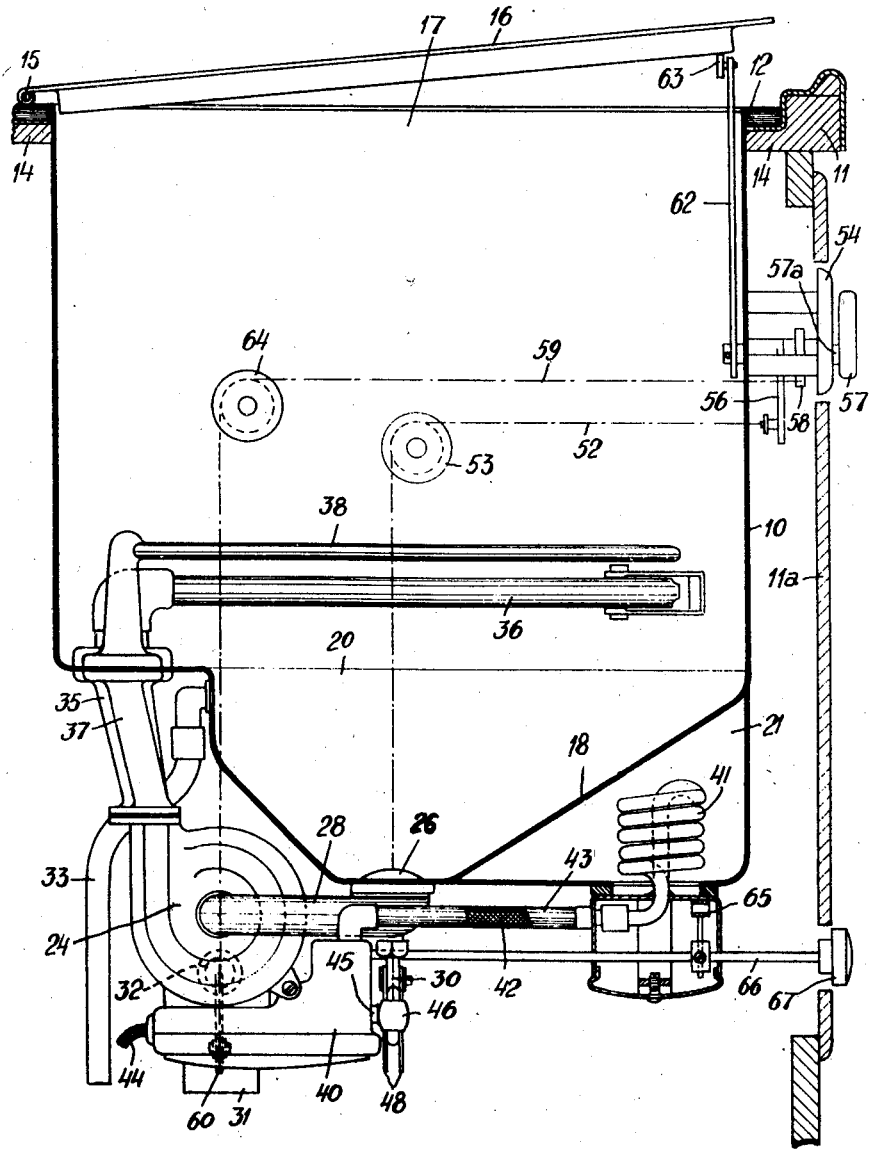
Fig. 1 is a lateral view of the machine partly in section.
Figure 2:
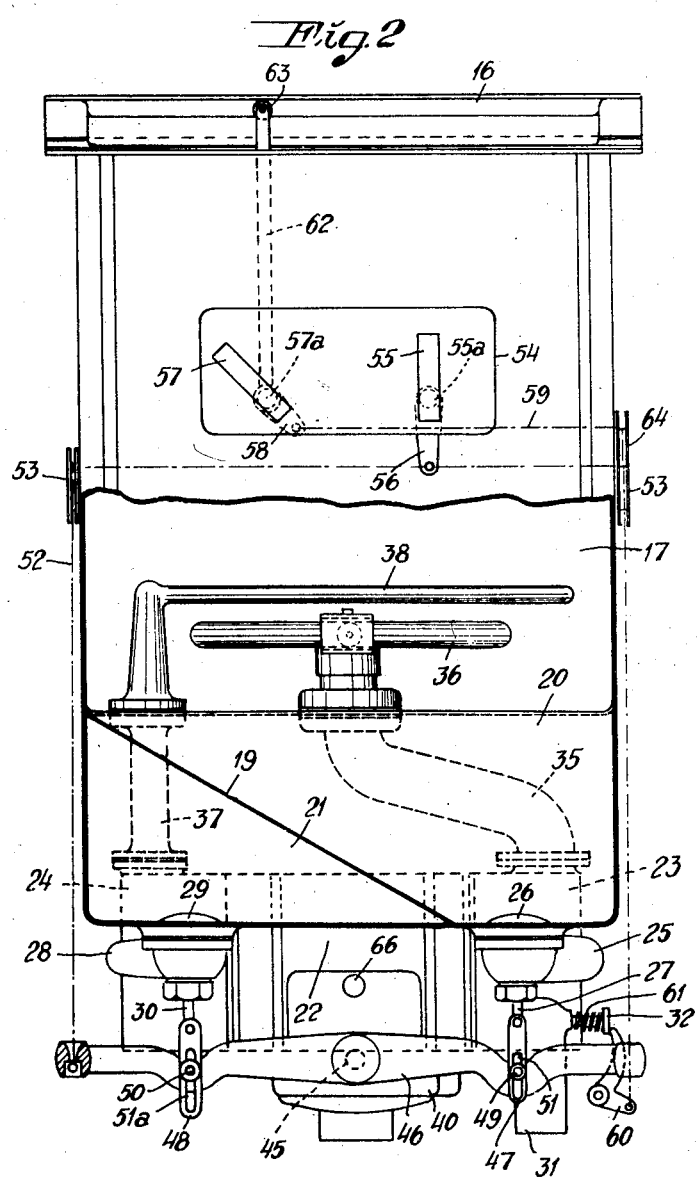
Fig. 2 is a front view thereof also partly in section.

The general structure of the machine is apparent from Figs. 1 and 2.

10 designates a casing built into a washing table 11 and resting with an upper flange 12 on a shoulder 14 formed around an opening in the table-top. At its top the casing 10 is closed by a cover 16 connected to the casing by hinges 15 and in its closed position lying in flush with the surface of the table-top. The casing forms a spraying space 17 for the dishes and is at its bottom formed to provide a container which by oblique walls 18, 19 is divided into two compartments, the one 20 for washing liquid and the other 21 for rinsing liquid. Provided below the spraying space 17 and behind the liquid container 20, 21 is a motor pump unit consisting of an electric motor 22 and pumps 23, 24 arranged on either side of said motor. A suction pipe 25 from pump 23 is connected to an opening provided in the bottom of washing tank 20 and controlled by a lift valve 26, the valve spindle 27 of which passes through suction pipe 25. Suction pipe 28, lift valve 29 and valve spindle 30 for pump 24 are arranged in similar manner in relation to rinsing tank 21. Connected to the lowermost point of pump 23 is a discharge pipe 31 controlled by a valve (not shown), the valve spindle 32 of which also passes through the wall of discharge pipe 31. 33 is an overflow pipe from washing tank 20.

By means of a rising pipe 35 washing pump 23 is connected with a spraying device for washing liquid illustrated as comprising a spray pipe 36 swingable horizontally to and fro in the lower portion of spraying space 17. A similar rising pipe 37 connects rinsing pump 24 with a spraying device for rinsing liquid comprising a stationary spray pipe 38 disposed in the lower portion of spraying space.

40 designates a control box which according to the invention encloses all electric members of the machine and is secured to the underside of the motor 22. As will be more fully described in the following, a switch enclosed in the box controls, on the one hand, the motor, on the other hand, an electric heating device 41 provided within rinsing tank 21, the wires 42 of said device passing into the box through a tube 43. 44 designates the leading-in cable.

Secured to a shaft 45 rotatably mounted in the wall of box 40 and carrying within same an adjusting member controlling the switch in a manner to be described in the following is a double-armed lever or balance beam 46 disposed immediately below the spindles 27, 30 of valves 26, 29 and connected with each of said spindles by links 47 and 48, respectively, a pin 49 and 50, respectively, on beam 46 engaging an elongated slot 51 and 51a, respectively, in the links. The arrangement is such that in each end position of balance beam 46 the one valve is closed and the other open. At its ends a wire 52 is secured to the ends of the beam 46 and passes over idle rollers 53 to an instrument panel 54 disposed on the front wall of the casing and accessible through an opening in a door 11a in the washing table. This instrument panel 54 carries a handle 55 the shaft 55a of which carries an arm 56 at the free end of which the wire 52 is secured. When handle 55 is turned in one direction or other, valves 26, 29 are opened and closed alternatingly.

Another handle 57 arranged on instrument panel 54 carries on its shaft 57a an arm 58 which by means of a wire 59 passing over an idle roller 64 is connected with a bell crank lever 60 controlling the spindle 32 of discharge valve of the washing pump 23 which valve by a spring 61 is urged towards closed position. Fixed to the same shaft 57a within machine casing 10 is an upwardly projecting arm 62 bearing with a roller 63 on the underside of cover 16 and serving to lift said cover through a small angle so that it can be grasped by hand.

As will be more fully described in the following, the switch is also actuated by a thermostat comprising a bimetallic member 65 disposed close by the bottom of rinsing tank 21 and actuating a shaft 66 which passes through the wall of box 40 and within said box carries an adjusting member actuating the switch. At its free end shaft 66 carries a hand-wheel 67 accessible through an opening in door 11a.

As shown in Fig. 3, control box 40 is by means of screws 70 secured to the underside of motor frame 22. The box has an elongated shape and contains at its one end a terminal block 71 for the motor and at its other end a switch designated as a whole by 72. In the embodiment shown the switch consists of a double pole two-way rocking switch comprising two mercury rockers 73, 74 having each two pairs of contacts which are connected with the source of current, the motor and the heater in a manner illustrated in the wire diagram in Fig. 8.

According to this diagram each of the leading-in wires 44 is connected with the inner contacts 73b, 73c and 74b, 74c of the contact pairs of rockers 73 and 74, respectively, whereas the motor 22 by wires 75 is connected with the outer contacts 73a, 74a of the one contact pair and the heater by wires 42 with the outer contacts 73d, 74d of the other contact pair. Thus, the motor and the heater 41 are coupled in parallel to the switch which has two contact positions and an intermediate currentless position, each of motor and heater being switched-in in one of said contact positions.

The two mercury rockers 73, 74 are secured to a common support or frame 80 having lateral plates 81 and 82, plate 81 being secured to a hollow shaft 83 mounted in the box and plate 82 journalled on a pin 85 fixed to shaft 45. Shaft 83 is actuated by a spring 84 tending to turn frame 80 together with mercury rockers 73, 74 in counter-clockwise direction as seen from the right in Fig. 3. The leading-in cable 44 is introduced into the box 40 through the cable fairlead 86 and cable terminal 87, and the motor wirings 44, 75 to and from the switch pass through the hollow shaft 83. On account of the relatively great distance between the switch and the terminal block 71 any risk of fracture of the wires is eliminated.

As mentioned above, valve balance beam 46 is secured to shaft 45, for instance by means of a pin 90 (see also Figs. 4 to 7). Within box 40 the shaft carries a follower arm 91 forming a mechanical adjusting member for the switch. At its free end arm 91 carries a roller 92 co-operating with a rocking lever 94 which is rotatably mounted on a pin 93 fixed to the box wall eccentrically to shaft 45, lever 94 being provided with three notches 95, 96, 97 which roller 92 engages in different positions. As stated above, frame 80 together with mercury rockers 73, 74 are actuated by spring 84 shown in Fig. 3 in counter-clockwise direction as seen in Figs. 4 to 7, said turning movement being limited by the engagement of a pin 98 on frame plate 82 with rocking lever 94 locked by arm 91.

In Figs. 4 to 6 valve balance beam 46 is indicated by the chain-dotted line 46a.

In the position of the switch shown in Fig. 4 rinsing valve 29 is open and washing valve 26 closed. The motor is switched-in, that is the machine is set for rinsing. In this position roller 92 engages right-hand notch 95 in the rocking lever 94 and the switch assumes its right-hand end position. When the machine is to be shifted to washing, handle 55 is turned in clockwise direction as seen in Fig. 2 causing balance beam 46 and thereby follower arm 91 to be turned in counter-clockwise direction in Fig. 4. Thereby rocking lever 94 and, thus, frame 80 are released, the latter being turned in counter-clockwise direction under the action of spring 84 bringing with it rocking lever 94 in the same direction by pin 98. Thereby the circuit of the motor is opened. When balance beam 46 assumes horizontal position (see Fig. 5) follower arm 91 has been turned through such an angle that its roller 92 engages the middle notch 96 of rocking lever 94 locking said lever in this position, in which rocking lever 94 by the engagement of pin 98 locks the switch in the left-hand end position in which the circuit of the heater is closed. On continued turning of balance beam 46 follower arm 91 is turned through a further angle in counter-clockwise direction, causing its roller 92 to turn rocking lever 94 in clockwise direction, until roller 92 engages the left-hand notch 97 of rocking lever 94 (see Fig. 6) which in turn by means of pin 98 returns the switch to the right-hand end position in which the circuit of the motor is again closed. Now the machine is set for washing.

On the turning of balance beam 46 rinsing valve 29 can fall down due to its own weight but washing valve 26 remains first unactuated on account of pin 49 sliding in slot 51 in link 47. First at the end of the rotation of beam 46, however, before the motor is again switched-in, pin 49 strikes the upper end of slot 51 thereby lifting valve 26. Thus, the pin and slot connection 49, 51, and 50, 51a, respectively, permits a certain lost motion of balance beam 46 during which the switch opens the circuit of the motor.

In the embodiment shown the switch is, as mentioned above, arranged to be actuated except by valve balance beam 46 also by thermostat 65 disposed close by the bottom of rinsing tank 21 near heater 41 (see Fig. 3). Secured to the lower shank of bitmetallic member 65 (see also Fig. 7) is a plate 101 having an angular notch 102. Engaging said notch by its preferably rounded-off end is a rod 103 which passes eccentrically through a disc 104 fixed to shaft 66 and which may be locked by means of a screw 105. Thereby the length of the portion of rod 103 lying outside the disc may be varied and, thus, also the temperature at which the thermostat responds.

Within box 40 shaft 66 or its extension carries an arm 106 which forms another adjusting member for the switch in the form of a movable abutment. Arm 106 cooperates with an abutment 107 on frame 80. A spring 108 of a strength greater than that of spring 84 tends to turn shaft 66 and thereby arm 106 in counter-clockwise direction in Fig. 7, abutments 109, 110 provided on the box wall limiting the turning of arm 106.

In the above explanation of the operation of the switch on the adjustment thereof by means of handle 55 and balance beam 46 it is assumed that the thermostat is switched-in as shown by full lines in Fig. 7 but that the temperature in the rising tank is below that temperature at which the thermostat responds. When this temperature is attained the lower shank of the bimetallic member 65 releases rod 103 causing shaft 66 to be turned in counterclockwise direction in Fig. 7 under the action of spring 108, arm 106 being thereby moved from the position shown in this figure by full lines into the position shown by dotted lines. In this new position of arm 106 the switch will on adjustment be stopped in a middle position in which it is currentless. Thus, the switch cannot be turned into its left end position in which the heater is switched-in. The thermostat may also be switched in and out manually by actuating the handle 67.

When the thermostat is switched-in but the temperature is too low the switch will, consequently, on the adjustment of valves 26, 29 from washing into rinsing position and vice versa transiently switch in the heater, when balance beam 46 assumes horizontal position, but if the thermostat is switched-out either manually by handle 67 or automatically under the action of the temperature in rinsing tank, the switch will on the adjustment of the valves be transiently stopped in currentless position (dotted lines in Fig. 7), arm 106 thereby preventing the switch from assuming the position of Fig. 5 because the strength of spring 108 is greater than that of spring 84.

As mentioned above, in the embodiment shown the lifting of the cover into graspable position and the setting of the discharge valve of the washing pump is effected by a common handle 57 which in Fig. 2 is shown to be set in the position in which the cover is lifted by arm 62. As it is of importance that actuation of the switch is prevented, when the cover is open or when the discharge valve is open, and, vice versa, actuation of the cover and the discharge valve is prevented, when the switch assumes current carrying position, especially when the motor is switched-in, handles 55 and 57 are operatively connected in such manner that the one handle can be adjusted only when the other handle assumes inoperative position. This interlocking of the handles 55 and 57 is shown in Fig. 9.

Secured on each of shafts 55a and 57a of the handles is a disc 115 and 116, respectively, provided with an arcuate notch 117 and 118, respectively. Provided between the discs is a tube 119, and slidably mounted at each end of said tube is a piston 120 and 121, respectively, which is guided in a bracket 122 and 123, respectively, fixed to the instrument panel and which is adapted by its arc-shaped outer end to engage the notch 117 and 118, respectively, in the locking discs. A spring 124 provided within tube 119 between the pistons keeps the pistons in abutting engagement with the locking discs.

In Fig. 9 both of the handles assume resting position. If, for instance, handle 57 on shaft 57a is turned, piston 121 is pressed inwardly of tube 119 causing contraction of spring 124. Hereby a shoulder 121a on piston 121 displaces the loose tube 119 into engagement with piston 120 and the shoulder 120a on same, causing pistons 120, 121 and tube 119 to form a rigid locking member for disc 115. Thus, in their resting position locking discs 115, 116 are only resiliently locked to each other and any of them may be turned in either direction, but as soon as a locking disc has been turned from its resting position, the other disc will be positively locked in such manner that its turning is prevented.

The invention is not limited to the embodiment shown but may be applied also to dish washing machines of other type. For instance, the machine may be provided with only one pump and, thus, only one valve. The switch and the adjusting means for the valve or valves need not necessarily be operatively inter-connected, although this is, of course, of advantage.

What I claim is:

1. In a dish washing machine, a pump for forwarding a liquid serving for cleaning the dishes, an electric motor for driving said pump, an electric heater for heating the cleaning liquid, a two-way rocking switch having two current carrying positions and a currentless position, electric means to connect said motor and said heater with said switch, said switch being so arranged and constructed that in one of its current carrying positions the circuit of said motor is closed and the circuit of said heater is open and in its other current carrying position the circuit of said motor is open and the circuit of said heater is closed, manually operable means for moving said switch into either of its current carrying positions, and a thermostat responsive to the temperature of the cleaning liquid and arranged to move said switch from said last-named current carrying position into said currentless position.

2. In a dish washing machine according to claim 1, a liquid control valve, means to control said valve, means to connect said control means with said switch, and means manually to operate said control means thereby to positively operate said switch.

3. In a dish washing machine according to claim 1, a liquid control valve, means to control said valve, a rocking shaft, a support carrying the switch and mounted on said shaft, another shaft co-axial with said first-mentioned shaft and supporting said control means, means to connect said last-mentioned shaft with said switch carrying support, means to operate said last-mentioned shaft, and a follower secured to said last-mentioned shaft and formed to determine the rocking end positions of said support.

TORD ERIK DANIEL BILDE.